Sept. 5, 1967  W. B. BANKS  3,339,400
MASS PRESENCE SENSING APPARATUS
Original Filed Aug. 12, 1963  4 Sheets-Sheet 2
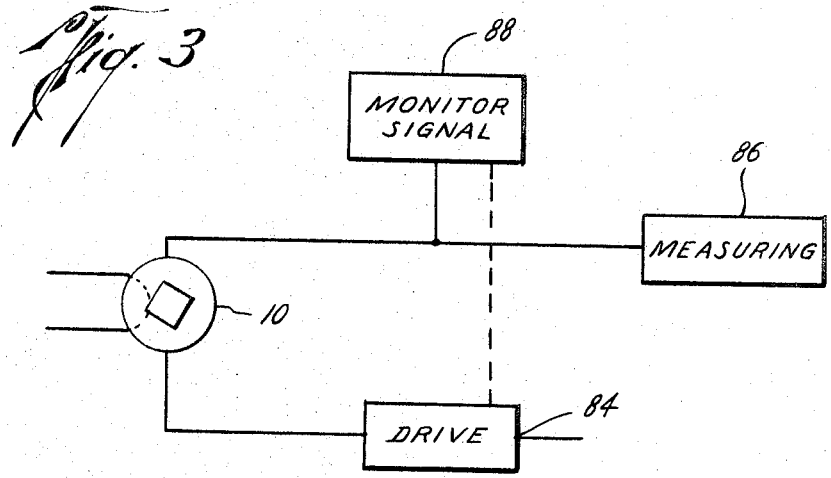
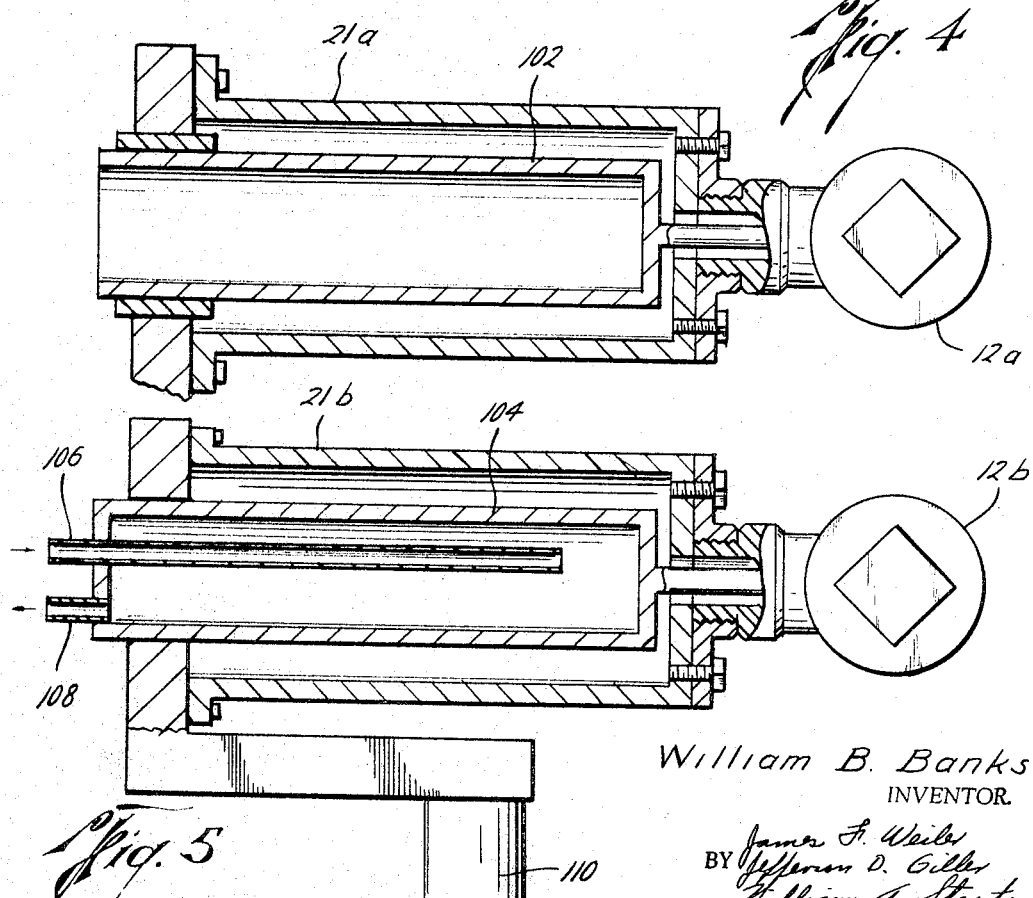
William B. Banks
INVENTOR.
BY James F. Weiler
Jefferson D. Giller
William A. Stout
Paul L. DeVerter II
ATTORNEYS

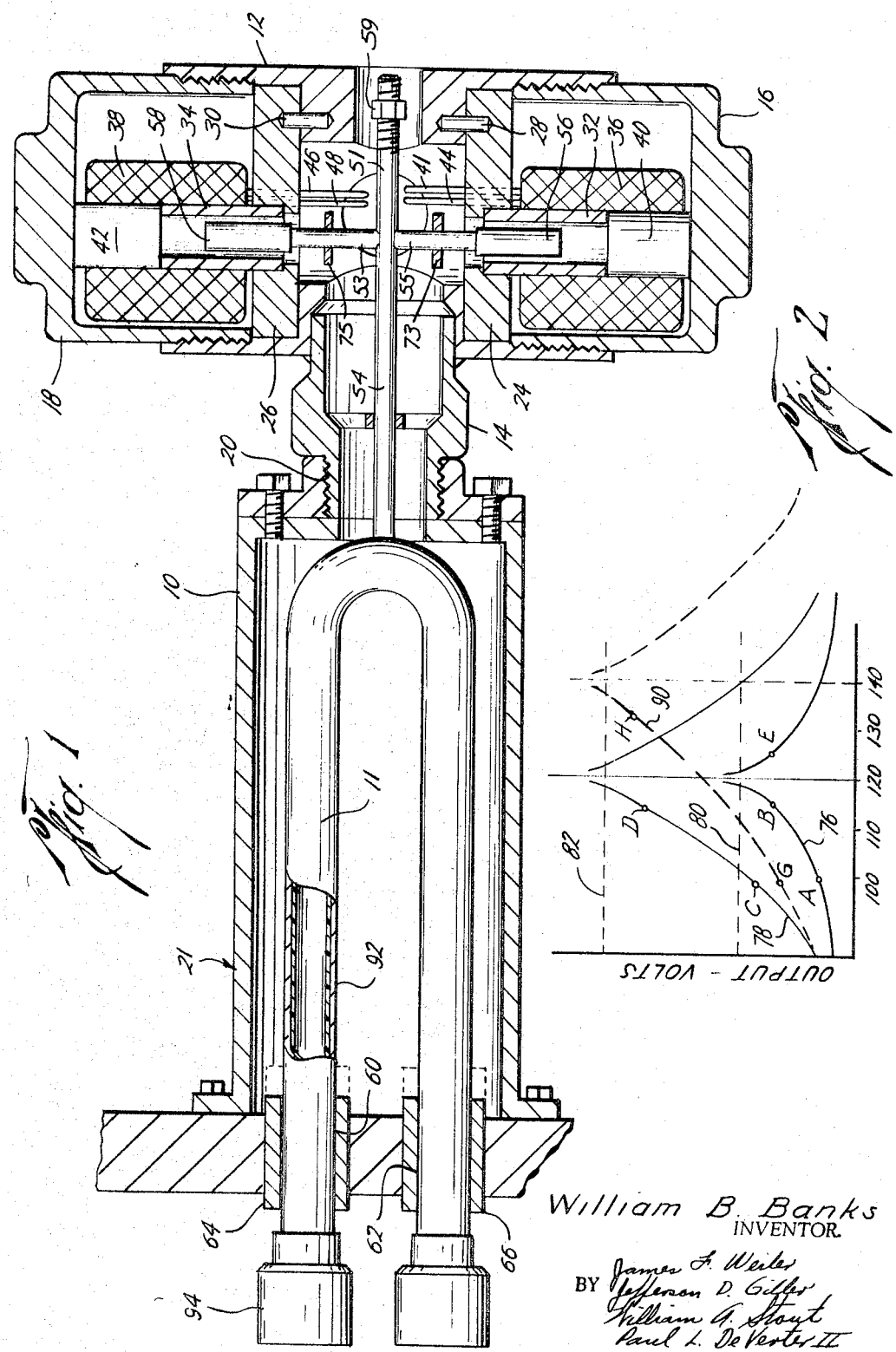

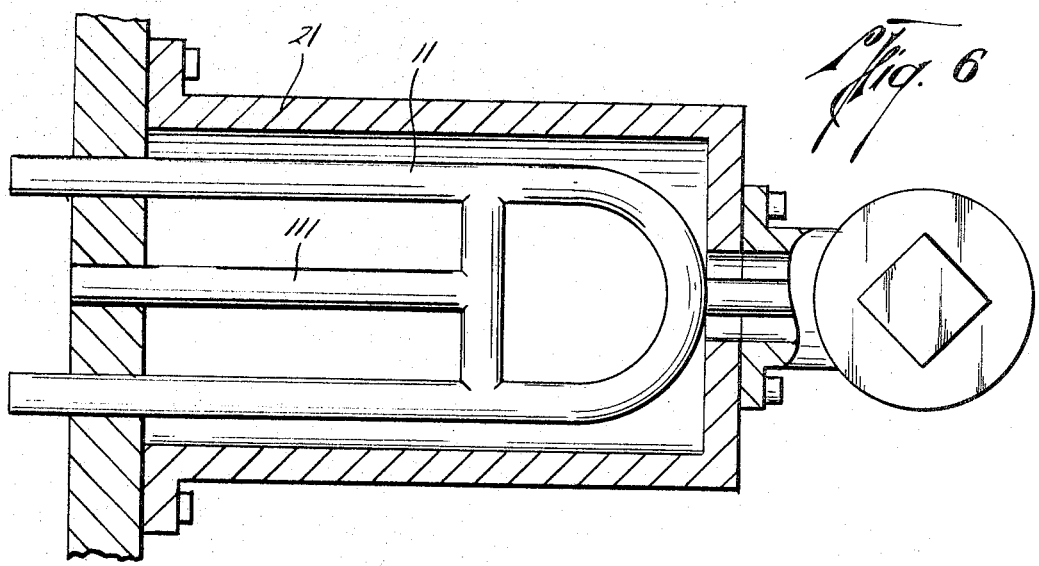
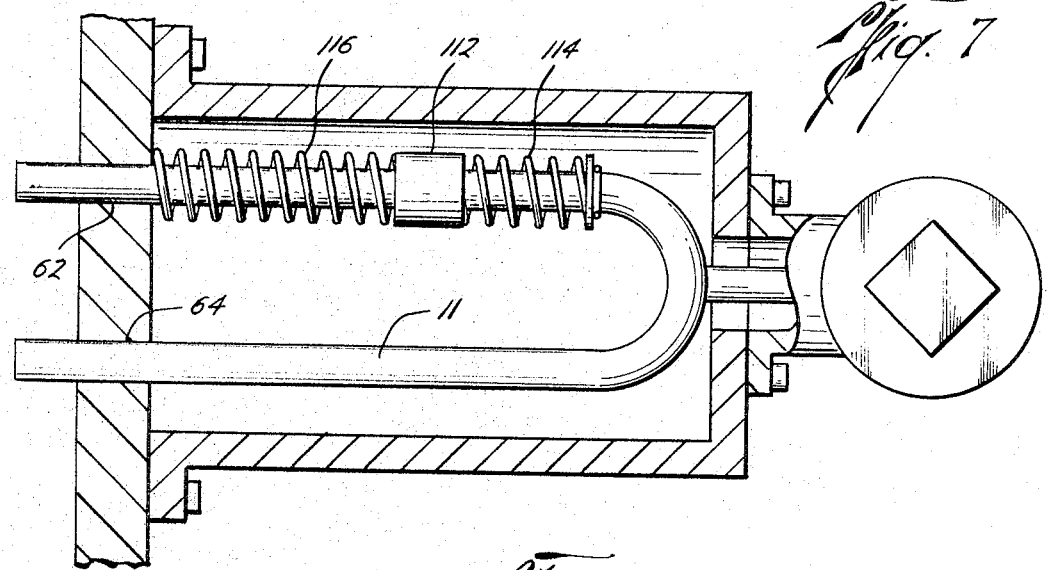
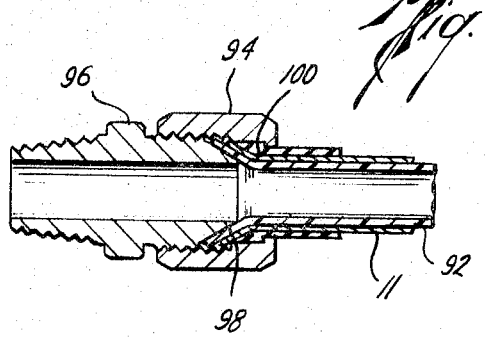

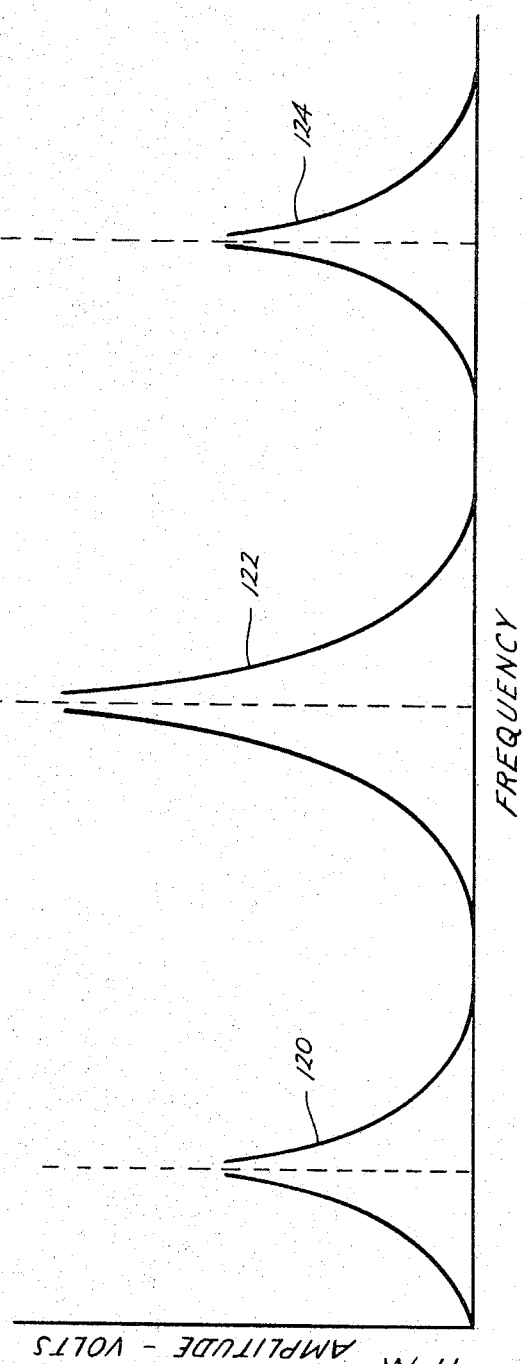

United States Patent Office 3,339,400
Patented Sept. 5, 1967

3,339,400
MASS PRESENCE SENSING APPARATUS
William B. Banks, Houston, Tex., assignor to Automation Products, Inc., Houston, Tex., a corporation of Texas
Continuation of abandoned application Ser. No. 301,250, Aug. 12, 1963. This application July 6, 1964, Ser. No. 381,610
10 Claims. (Cl. 73—32)

The present invention relates to mass presence sensing apparatus and more particularly to an apparatus for determing changes in the physical mass characteristics of materials and especially of fluent materials. This application is a continuation of my co-pending patent application Ser. No. 301,250, now abandoned, having the same title.

This invention is capable of wide general application in connection with the measurement of physical properties of materials such as density, weight, specific gravity and measurement of material level. The present invention is particularly useful in measuring the physical properties of flowing materials and can be used with liquids, gases, and flowable solids.

The apparatus of the present invention is generally directed to providing a hollow body for conducting the flowing material, vibration means for vibrating the body at a fixed frequency and, in order to provide sensitive yet accurate measurements, providing the body with a natural resonant frequency different from the fixed vibrating frequency such that the range of values being measured will be measured while the body is being operated at other than its natural resonant frequency, and includes amplitude vibration detection means connected to the body detecting a change in the amplitude of vibration of the body on a change in the mass of the material being measured.

A still further feature of the present invention is the provision of means connected to the body for adjusting the natural resonant frequency of the body in order to select the desired frequency operating range of the body.

Yet a still further object of the present invention is a provision of a supporting structure for supporting the vibrating body which has a natural resonant frequency which is substantially less than the resonant frequency of the vibration means so as not to interfere with the operation of the vibrating body.

A still further object is the provision of a vibration and detection unit which has a natural resonant frequency substantially greater than the natural resonant frequency of the vibrating body so as to provide a sensitive measuring apparatus.

Yet a further object of the present invention is the provision of a tubular body having first and second ends, the first end being closed and attached to the vibration means and the second which is connected to and supported adjacent the node point of the natural resonant frequency of the body by support means whereby a large volume of material may be measured thereby providing accurate measurements. If it is desired to provide for flow through such a body an outlet is provided from the body and an inlet conduit is provided extending into said body to a point spaced from the outlet.

A still further object of the present invention is the provision of a vibration amplitude limiting circuit which is connected between the apparatus detection means and the vibration means for shutting down the vibration means when the output signal increases above a predetermined amount thereby preventing damage to the vibrating body.

Yet a still further object of the present invention is the provision of a mass presence sensing apparatus provided with a U-shaped body for conducting material, vibration means connected to and vibrating the body at a fixed vibration frequency, the U-shaped body having a natural resonant frequency different from the fixed frequency whereby the U-shaped body will be operated over a range to detect changes in mass of the material when it is operating at other than its resonant frequency.

Yet a further object of the present invention is the provision of an apparatus including a vibrating U-tube wherein the operating frequency and the natural resonance frequencies of the components of the apparatus are selected with reference to the natural resonant frequency of the U-tube to provide a sensitive and an accurate instrument for measuring the mass or changes in the mass of material flowing through the U-tube.

Yet a further object of the present invention is the provision of temperature compensating means in order to avoid output signal changes from the apparatus due to temperature changes. One such structure is the provision of an auxiliary support connected to the body which is of a constant temperature modulus alloy for reducing the effects of temperature. Another temperature compensating structure involves the use of a weight member slidably connected to the body which is moved to change the natural resonant frequency of the body as the temperature changes so as to compensate for such temperature changes.

Other and further objects, features and advantages will be apparent from the following description of presently preferred embodiments of the invention, given for the purpose of disclosure, and taken in conjunction with the accompanying drawings, where like character references designate like parts throughout the several views, and where, FIGURE 1 is an elevational view, partly in section, illustrating one form of the present invention in which a U-shaped tubular body is being adapted to measure changes in the mass of fluid flowing therethrough, FIGURE 2 is a graph illustrating operating characteristics of the tubular body of the present invention, FIGURE 3 is an electrical block diagram illustrating a vibration amplitude limiting circuit for use with the present invention, FIGURE 4 is an elevational view, partly in section, illustrating another form of the invention in which a cylindrical body is vibrated to measure the material, FIGURE 5 is an elevational view, partly in section, illustrating still another form of the present invention in which a cylindrical body is provided having a suitable inlet and outlet insuring that the material flows through the body, FIGURE 6 is an elevational view, partly in section, illustrating an addition to the present invention for compensating for frequency changes in the body due to temperature changes, FIGURE 7 is an elevational view, partly in section, illustrating still another temperature compensating apparatus for use with the present invention, FIGURE 8 is a fragmentary enlarged view, in cross-section, illustrating the connection of a lining to the interior of a body of the present invention, and FIGURE 9 is a graph illustrating the frequency relationship of the various components of the present invention.

The present invention is generally directed to providing a hollow body which is adapted to contain a material to be measured. The body and its contained material is then vibrated but at a frequency different from its natural resonant frequency for maximum resolution. The amplitude of vibration of the body containing the material is then measured which is an indication of the value or change in the value of the physical property of the mass of the material being measured.

Referring now to the drawings, and particularly to FIGURE 1, the reference numeral 10 generally designates one embodiment of an apparatus for determining a mass or change in the mass of material. The apparatus 10 generally includes means for vibrating, and means for detecting the amplitude of vibration of a hollow body 11 through which the material being measured is flowed.

The vibration means and vibration detecting means, for ease in manufacturing and maintenance, are enclosed in a housing 12 which includes a central T-shaped tubular portion 14 and tubular end portions 16 and 18. The central tubular portion 14 is preferably externally threaded at its outer end 20 for making a threadable connection to a suitable support structure 21. Also connected to the central tubular portion 14 is an internally threaded connection (not shown) for attachment to a suitable electrical circuit (not shown), which will be more fully discussed hereinafter.

The motor or drive vibration means assembly is enclosed in and located in the housing end 16. A retaining disc 24, which provides support for the vibrator assembly is supported in the central housing end portion 16 by a dowel pin 28 or other suitable means and secured in place in the end 16. A tubular nonmagnetic sleeve 32 is supported in the retaining disc 24 by a counter sunk shoulder and extends into the interior of the end 16. Within the end 16 electromagnetic coil 36 surrounds and is supported by the tubular sleeve 32. A magnetic core 40 is located within the electromagnetic coil 36 at one end of the nonmagnetic sleeve 32. Electrical connections 41 and 44 supply electrical current from an external source to the electromagnetic coil 36 which sets up vibrations in a vibratory armature 56 which is connected to arm 55 of a cross-shaped rod 54 which is in turn connected to and vibrates the hollow body 11 at the frequency of the external source.

The amplitude detecting means or generator assembly is located in the housing end portion 18. A retaining disc 26 provides a support for the vibration detecting means and is secured in the central portion of the housing by dowel pin 30, and in turn supports a nonmagnetic tubular sleeve 34 in the housing end 18. A permanent magnet 42 is disposed within an electromagnetic coil 38 at one end of the nonmagnetic sleeve 34 thus providing a nonmagnetic field for the coil 38. Connected to the electromagnetic coil 38 are electrical connections 46 and 48 which carry the signal generated in the detecting coil to suitable electrical indicating or control means. Any suitable electric coil or detecting means may be used such as control relays or indicating volt meters (not shown) which can be used to control the mass of the material or indicates the value or change in the mass property being measured of the material. Since these control and indicating means are conventional and do not constitute part of the invention, no further description is deemed necessary.

The magnetic armature 56 vibrates in response to the frequency of the electrical voltage applied to the electromagnetic coil 36 and in turn causes the connecting rod 54 and the body 11 to vibrate at this applied or excitation frequency. Rod 54 also includes an arm 53 which extends into the tubular element 34 in the amplitude detecting assembly and supports a magnetic armature 58 at its end which vibrates and induces a voltage in coil 38 which is indicative of the amplitude of vibration of the body 11.

While the rod 54 and the vibration means and the vibration detecting means may be connected to the body 11 to vibrate it in any desired direction, it is shown in FIGURE 1 as being vibrated in a plane containing both legs of the U-shaped body 11 so as to vibrate the body 11, the material which it contains, and to detect the change in amplitude of vibration which occurs upon a change in the mass of the material passing through the body 11.

Thus, the armatures 56 and 58 are physically connected to the hollow body 11. Preferably, the arms 53 and 55 are made of a nonmagnetic material in order to isolate the vibration armature 56 and the detecting armature 58 from each other magnetically so as to prevent magnetic interference from each other. In addition, it is noted that rod 54 includes an extension 51 which is threaded and adapted to receive a weighed nut 59. Thus, as the position of the nut 59 is changed on the extension rod 51 the natural resonant frequency of the body 11 will be changed for purposes of tuning the apparatus and obtaining suitable operating characteristics as will be more fully described hereinafter.

Guides 73 and 75 are secured to the interior of the central portion of the housing 14 and include an opening which slidably receives and guide arms 55 and 53, respectively. The guides limit the direction of the vibration of the rods 53 and 55 thereby insuring that extraneous motion is not introduced into the vibrating elements of the apparatus to clutter up the signal received.

Thus, when the armature 56 is vibrated in response to an electrical signal applied to the electrical conductors 41 and 44, the body 11 and the material passing through the body will vibrate in accordance with that signal. Furthermore, the amplitude measuring armature 58 will also vibrate in response to the vibration of the body 11 and induce a signal in electrical conductors 46 and 48 which is proportional to the amplitude of vibration of the body 11. To prevent blocking of the vibrations in the body 11, the body 11 is supported at points 60 and 62 by a suitable support structure 21. The support points 60 and 62 are positioned adjacent the node points of the natural resonant frequency of the body 11, but as will be more fully explained hereinafter, the body is vibrated off of its natural resonant frequency by the vibration of the armature 56. As it may be desirable to make broader adjustments in the natural resonant frequency of the body 11 than can be provided with the adjustment of nut 59 to provide for the desired frequency operating range, annular adjustment sleeve means 64 and 66 are provided to connect the body 11 to the support structure 21. The position of the adjustment sleeves 64 and 66 may be moved as shown in the dotted outline to broadly adjust the natural resonant frequency and thus the operating range of the body 11.

Thus, is it noted that the operating characteristics of the body 11 may be changed so as to change the natural resonant frequency of the body 11. A broad adjustment may be made by positioning the annular sleeves 64 and 66 relative to the body 11 to secure the desirable range and a fine adjustment may be made by adjusting the position of the weighed nut 59 on the extension arm 51.

Referring now to FIGURE 9, the desired frequency relationships of the various components of the apparatus 10 is best seen. The graphs show the curves for the amplitude-frequency response of the components with curve 120 being the curve for the support structure 21, the curve 122 being the curve for the body 11, and the curve 124 being the response curve for the vibration and detecting assembly which includes the rod 54 and its connecting elements. It is to be noted first that the support curve 120 has a much lower frequency response than the body curve 122. Thus, vibration of the support 21 will not interfere with the output signal from the body curve 122, which is the curve which changes in response to changes in the mass of material flowing through the body 11. Similarly, the natural resonant frequency of the vibration and detection assembly connected to rod 54 is selected so that it has a much higher frequency response curve 124 than the curve 122 of the body 11. Thus, because of the difference in the natural response frequencies of the different components of the apparatus 10, there is no interference with the portion of the apparatus, the body 11, that is a measure of the mass of the material and which is desired to be measured.

Referring now to FIGURE 2, two operating curves 76 and 78 having different input voltages to the driving coil 36, are best seen which show the response characteristics of the body 11 or the voltage output of the detector coil 38 in response to the frequency at which the body 11 is vibrated. While it is noted that the maximum sensitivity occurs at the peak points of the curve, that is, when the body 11 is vibrating at its natural resonant frequency, it has been found that it is preferable not to operate at natural resonant frequency for several reasons. First, there is a dead band width of poor resolution at the natural resonant frequency which results in an unstable output signal. Furthermore, since the operating characteristic curve is symmetrical about the natural resonant frequency there is a point on each side of natural resonant frequency which will have the same output signal, but which would be at different operating frequencies and which therefore should denote two different values of the mass of the material in the body 11. That is, referring to operating curve 76 it is preferable to operate the body 11 in the range from A to B which is off of natural resonant frequency. It is noted that if the body is vibrating at higher than natural frequency there will be a point E which will give an output similar to point B but which is in fact a different operating frequency. Therefore, it is desired to limit the operation of the body 11 to a range from A to B on one side of the natural resonant frequency point. If more sensitivity is desired, the input drive voltage to the driving coil 36 may be increased so that the apparatus 10 will assume the operating curve 78 and will operate in the range C to D which thereby provides a more sensitive output signal for the same frequency change.

Another reason for not operating body 11 at its natural resonant frequency is the fact that if it is operated with sufficient power to overcome any external effects on the body 11 the metal body 11 will be fatigued and fail. Therefore, it is preferable to operate the body 11 off of natural resonant frequency so that a greater amount of power may be utilized to drive the body 11 and it will thus not be as sensitive to external conditions, and yet it will not be subject to fatiguing. For this reason there are upper limits above which it is not desired to operate the body 11. Thus, with reference to curve 76 the maximum amplitude of vibration should be limited to line 80 and with reference to operating curve 78 the maximum amplitude of vibration is limited to line 82.

Referring now to FIGURE 3 a suitable drive circuit 84 is provided to apply the desired voltage to the driving coil 36 of apparatus 10 and a suitable measuring circuit 86 is provided to receive the output signal from the output coil 38 of apparatus 10. In order to limit the amplitude of vibration below the natural resonant frequency a monitor circuit 88 is provided which receives and monitors the output signal from the apparatus 10 and when the output signal reaches an amplitude limiting value such as shown by lines 80 and 82 (FIGURE 2) the monitoring circuit will disconnect the drive circuit 84 and if desired actuate an alarm circuit (not shown).

Referring again to FIGURE 2 if it is desired to increase the range of the measurement being made the natural resonant frequency of the body 11 may be increased wherein the annular adjustment sleeves 64 and 66 (FIGURE 1) are moved upwardly as shown by the dotted lines to increase the natural resonant frequency of the body 11 and thus produce a wider operating curve 90 having an operating range of from G to H.

Referring now again to FIGURES 1 and 8, the body 11 is shown having a liner 92. The U-shaped body of FIGURE 1 is suitable for insertion in the usual process lines. Thus flowing material which is under pressure can be effectively measured without interfering with the processing of the material. And in the case of corrosive materials a suitable liner may be utilized such as sold under the trademark Teflon wherein a liner 92 may be easily slipped into place through the material of the tube 11 to protect the tube 11 against corrosion. Suitable piping connections 94 may be provided which fit around the ends of the tube 11 and liner 92, which are flared outwardly to receive a connector 96 having a wedge face end 98 and which coacts with a wedge member 100 to clamp against the flaring ends of the tube 11 and liner 92 to provide a fluid tight connection and thus protect the body 11 against corrosion.

Of course, various modifications of the present apparatus may be made which include a vibration means transmitting vibration to a material conducting body which in turn transmits vibration to an amplitude measuring means thereby measuring values and changes in the mass of the material in the body. FIGURES 4 and 5 illustrate modifications of the present invention, the letters $a$ and $b$ being applied to the parts generally corresponding to those in FIGURE 1 for convenience of reference.

Referring now to FIGURE 4, a modification of the present invention is shown in which the hollow body 102 is in the form of a tubular body instead of being U-shaped as in FIGURE 1. In this case the material to be measured enters the body 102 and provides a large volume of material whereby smaller changes in the mass of the material can be detected than with the U-tube body of FIGURE 1. This particular type structure is also useful in measuring material level wherein the apparatus is attached to the side of a vessel at the level at which the position of the material is desired to be measured or controlled.

In order to utilize a large vibrating body and still measure changes in a flowing material the embodiment of FIGURE 5 may be utilized. A cylinder 104 is provided which is vibrated around the base of the support 21$b$ and is provided with an inlet tube 106 and an outlet tube 108 one of which terminates at one end of the cylinder and the other of which terminates adjacent the second end of the cylinder 104 and spaced from the outlet 108 to insure that the fluid in the cylinder is continually changed as the material flows in the inlet 106 and out the outlet 108 to provide an accurate measurement of the changes in the mass of the flowing material. Preferably the inlet and outlet are connected to the cylinder body 104 at the end remote from the connection to the vibrating assembly in order not to effect the vibration of the body 104 and thus of the output measurements.

All of the various embodiments of the present invention may be suitably mounted on a support base 110 as shown in FIGURE 5. However, the mounting support 21 and the various supporting structures should itself have a natural resonant frequency that is substantially lower than the natural resonant frequency of the body, as previously explained, to insure that the support structure and base are not subject to vibration which would interfere with the vibration of the operating body.

Of course, since the vibrating body is of metal, its modulus of elasticity will vary with temperature and thus its natural resonant frequency and operating characteristics will change as the temperature changes. Thus, referring to FIGURE 6, a temperature compensating support 111 is provided having one end connected to the support structure 21 and is shaped in the form of a T with the ends of the T connected to legs of the U-shaped body 11. The temperature compensating support 111 is made of a constant modulus metal alloy such as sold under the trade name of Ni-Span-C or Iso-Elastic. Thus, on a change of temperature, while the natural resonant frequency of the body 11 will change, there will be a smaller percentage effect due to temperature changes because of the support of the temperature compensating member 111 which vibrates with and supports the body 11.

Referring now to FIGURE 7, a still further temperature compensating apparatus is shown being connected to the embodiment of the invention shown in FIGURE 1. Thus, a tuning slug 112, which is slidably connected to the body 11, is yieldably urged in a direction to decrease the natural resonant frequency of the body 11 by a constant modulus compression spring 114. The movement of the tuning slug 112 is resisted by a ferrous compression spring 116 which also loses strength as the temperature increases. Therefore, as the temperature increases the natural resonant frequency of the body 11 decreases. However, at the same time the force exerted by the ferrous spring 116 also decreases whereby the tuning slug 112 is moved towards the support points 62 and 64 by spring 114 which tends to increase the natural resonant frequency of the body 11. Thus, the natural resonant frequency of the body 11 is maintained as the temperature changes.

In use, and referring to FIGURE 1, a suitable electric source is connected by the electrical conductors 41 and 44 to the electromagnetic coil 36 which constitutes the vibration means by which the hollow body 11 is caused to vibrate. When the electromagnetic coil 36 is energized by an alternating current, the vibration armature 56 is attracted and released so as to cause the connecting rod 54 to vibrate at the frequency of the applied electric source. Thus, the vibration of the connecting arm 54 is transmitted to the hollow body 11. In turn, the vibration of the hollow body 11 is transmitted back to the rod 54 to the amplitude vibrating armature 58. Electromagnetic or pick-up coil 38 thus generates a voltage caused by the vibration of the armature 58 in the magnetic field of the permanent magnet 42. The signal from this detecting or pick-up coil 38 is transmitted through electrical conductors 46 and 48 to any suitable type of electrical circuit having electrical indicating or control means (not shown). The value or changes in the mass of the material which passes through the hollow body 11 affect the amplitude of vibration of the hollow body 11 which is reflected and transmitted to the amplitude detecting armature 58.

Preferably, a fixed vibration frequency is used, such as the conventional 60 cycle vibration frequency which results in a 120 cycle per second vibration of the body 11. Referring now to FIGURE 2, it is noted that the natural resonant frequency of the body 11 is selected so that the body is vibrated off of its natural resonant frequency. For instance, a typical operational curve would be curve 90 where a typical sixty cycle operational frequency, being 120 vibrations per second is utilized and where the natural resonant frequency of the body is selected as 140 cycles per second. Therefore, the operational range for the selected material would be along the line G–H. The selection of the resonant frequency of the body 11 may be accomplished by suitably adjusting the sleeves 64 and 66 (FIGURE 1) along the legs of the body 11. Since this changes the effective support point and affects the rigidity of the legs of the body the natural resonant frequency of the body may be controlled. Also, by moving the weight nut 59 on the extension 51 a finer tuning adjustment of the natural resonant frequency of the body 11 can be made. And of course, the natural resonant frequency of the body 11 depends upon the direction of vibration. If vibrated as shown in FIGURE 1, the body will have a relatively high natural resonant frequency as compared to the case where it is vibrated in a direction transverse to the plane of the legs of the body 11.

And as previously mentioned in referring to FIGURES 2 and 3, it is desirable to limit the amplitude of vibration of the body 11 in order not to fatigue the metal body and therefore a suitable control circuit as shown in FIGURE 3 may be provided for this purpose. Thus, if the material passing through the body should suddenly change causing a substantial increase in the amplitude of vibration, the monitor circuit 88 would detect this increase in signal and thereby shut-down the drive circuit 84 to prevent damage to the vibrating body 11.

Referring now to FIGURE 9, it is also noted that the natural resonant frequency of the various components of the apparatus 10 are selected in relation to each other in order to achieve maximum sensitivity and to assure that the output signal is affected only by changes in the mass of the material flowing through the body 11. Therefore, the mounting 21 is selected to have a low natural resonant frequency curve 120 which does not overlap the natural resonant frequency curve 122 of the body 11. Similarly, the vibratory detecting assembly, which includes the rod 54 and its connecting elements, is selected to have a high natural resonant frequency curve 124 which also does not overlap the body response curve 122. Because of the selection of the natural resonant frequency of the components of the apparatus 10, and because of the fact that the body 11 is operated at off its natural resonant frequency, the vibration of the body 11 will not be affected by external conditions and a sufficient amount of power can be utilized to actuate the body 11 so that any external conditions will not affect the output signal.

Referring now to FIGURES 4 and 5, cylindrical bodies 102 and 104 may be utilized in place of the U-tube shown in FIGURE 1 thereby accommodating a greater amount of material so that minor variations in the material will more easily be detected thereby providing a very sensitive instrument. In order to insure that the material flowing in the cylindrical body will be flushed out and changed in the case of a flowing material, outlet conduit 108 is provided and inlet conduit 106 is provided communicating with the body 104 and with the end of the inlet conduit 106 terminating at the position spaced from the outlet 108. Thereby as the fluid flows in the inlet 106 and out the outlet 108 the material in the body 104 will be periodically changed.

And as previously mentioned, since changes in temperature will affect and change the natural resonant frequency of the body 11 suitable auxiliary equipment may be utilized to compensate for the temperature changes. In FIGURE 6, a T-shaped support 111 of a constant modulus alloy may be utilized to assist in supporting the body 11. Thus, the additional support 111, which is relatively independent of the temperature changes insures that the temperature will have a less percentage effect on changing the natural resonant frequency of the combined body 11 and support 111.

And the tuning slug 112 in FIGURE 7, which is slidably connected to the body 11, is adapted to move in a direction to compensate for temperature changes. Thus, when a temperature change causes a change in the natural resonant frequency of the body 11, a similar change will occur in the ferrous spring 116. However, since the spring 114 is made of a constant modulus type alloy, it will not be affected by the change in temperature, and will therefore move the tuning slug 112 in a direction to overcome the spring 116 and to maintain a constant natural resonant frequency of the combination of the tuning slug 112 and the body 11.

The present invention therefore is well adapted to carry out the objects and attain the ends and advantages mentioned as well as others inherent therein. The presently preferred embodiments of the invention are given for the purpose of disclosure, and numerous changes in the details of construction, and arrangement of parts will readily suggest themselves to those skilled in the art and which are encompassed within a spirit of invention in the scope of the appended claims.

What is claimed is:

1. A mass presence sensing device for flowing materials comprising:
    a hollow body for conducting said flowing material,
    support means supporting said body adjacent the node point of the natural resonant frequency of the body, said support having a natural resonant frequency substantially less than the natural resonant frequency of the body,
    vibration means connected to the body for vibrating said body, said vibration means having fixed vibration frequency,
    the body having a natural resonant frequency different from the fixed vibration frequency by an amount such that the range of material values being measured will not cause the body to vibrate at natural resonant frequency, and amplitude vibration detection means connected to said body for detecting a change in the vibration of the body on a change in the mass of the material flowing in the body.

2. A mass presence sensing apparatus for flowing materials comprising:

a hollow body for conducting said flowing material, support means supporting said body adjacent the node point of the natural resonant frequency of the body, a vibration amature connected to the body, an amplitude vibration detection armature connected to the body for detecting a change in the vibration of the body on a change in the mass of the material flowing in the body, vibration means vibrating the amature at a fixed vibration frequency, the body having a natural resonant frequency different by an amount from the fixed vibration frequency such that the range of material values being measured will not cause the body to vibrate at natural resonant frequency, said support means having a natural resonant frequency substantially different from the natural resonant frequency of the body, said vibration armature and said detection armature having a natural resonant frequency substantially different from the natural resonant frequency of the body, and means measuring the amplitude of vibration of the detection armature.

3. The invention of claim 2 wherein the body includes:

a tube having first and second ends, said first end being closed and connected to the vibration means, and the second end being supported adjacent the support means, said tube having an opening adjacent the second end, and a conduit connected to the tube at the second end and extending interiorally of the tube and terminating at a point spaced adjacent the first end.

4. The invention of claim 2 including means connected to said body for adjusting the natural resonant frequency of said body.

5. The invention of claim 4 wherein said means includes an annular sleeve positioned between said support and said body.

6. The invention of claim 4 wherein said means includes a weight adjustable member connected to said body.

7. The invention of claim 2 including temperature compensating means comprising:

a weight member slidably connected to said body, a ferrous spring acting against the member in a direction to increase the natural resonant frequency of the body and connected weight member, said ferrous spring becoming weaker as the temperature increases, a constant modulus compression spring acting against the weight member in a direction opposite to the ferrous spring.

8. The invention of claim 2 including:

a vibration amplitude limiting electrical circuit, said circuit connected between the amplitude measuring means and the vibration means and actuated to shut down the vibration means when the output signal increases above a predetermined amount.

9. A mass presence sensing apparatus for flowing materials comprising:

a U-shaped hollow body for conducting said flowing material, support means supporting said body adjacent the node points of the natural resonant frequency of the body, a T-shaped rod, the body of said T being connected to the body, a vibration amature connected to the one arm of the T-shaped rod, vibration means vibrating the vibration armature at a fixed vibration frequency, an amplitude vibration detection armature connected to the other arm of the T-shaped rod for detecting a change in the vibration of the body, means measuring the amplitude of vibration of the detection armature, the body having a natural resonant frequency different by a predetermined amount from the fixed vibration frequency such that the range of material values being measured will not cause the body to vibrate at its natural resonant frequency, said T-shaped rod and armatures having a natural resonance frequency substantially different from the natural resonant frequency of the body.

10. The invention of claim 9 including:

guide means permitting the arms of said T-shaped rod vibrating in a longitudinal direction, but limiting transverse vibration of said arms.

References Cited

FOREIGN PATENTS

| | | |
|---|---|---|
| 622,844 | 6/1961 | Canada. |
| 786,113 | 11/1957 | England. |
| 827,234 | 2/1960 | England. |
| 1,217,957 | 12/1958 | France. |
| 146,081 | 11/1962 | U.S.S.R. |

OTHER REFERENCES

Co-Engineering Co., Densitor, June 4, 1962.

JAMES J. GILL, *Acting Primary Examiner.*

RICHARD C. QUEISSER, *Examiner.*

J. D. SCHNEIDER, *Assistant Examiner.*